Figure 1:
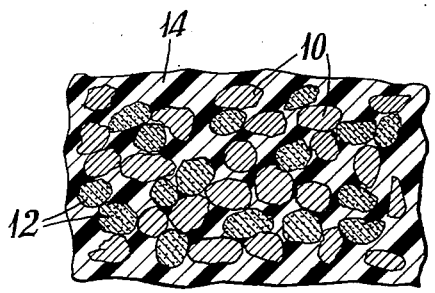

July 3, 1962 K. KORDESCH 3,042,732
ANODES FOR ALKALINE CELLS
Filed Oct. 14, 1959

INVENTOR.
KARL KORDESCH
BY
Robert C. Cummings
ATTORNEY

3,042,732
ANODES FOR ALKALINE CELLS
Karl Kordesch, Lakewood, Ohio, assignor to Union Carbide Corporation, a corporation of New York
Filed Oct. 14, 1959, Ser. No. 846,420
10 Claims. (Cl. 136—30)

This invention relates to alkaline primary and secondary cells, and more particularly, to improved anodes for use therein.

Powdered zinc anodes are capable of high discharge currents with alkaline electrolytes. The shelf life is also good, and therefore, such anodes are excellent partners for heavy duty cathodes such as manganese dioxide, nickel oxide, mercuric oxide and silver oxide in alkaline cells. For clarity's sake, the following discussion will be limited to the alkaline-manganese dioxide-zinc systems, but it is to be understood that the principles taught are equally applicable to the other alkaline systems mentioned above.

Unfortunately, when a cell is discharged beyond the depolarizing capacity of the manganese dioxide while having some active zinc remaining, the cell will tend to gas as a result of a corrosion couple formed between the carbon cathode and the zinc. Cell closure failures often occur as a result of such gassing. Similar situations occur when cells having slightly different capacities are employed in a multi-cell battery. Polarity reversals or over discharging and gassing occur in cells which reach complete discharge before others.

To prevent the above from occurring, it is common practice in the alkaline-manganese dioxide cells which are presently being constructed, to have the service life of the cell limited by the anode. Due to this feature, cells which are completely discharged have no remaining metallic zinc to initiate gassing. Unfortunately, this protective feature creates additional difficulties when a rechargeable version of an alkaline-manganese dioxide-zinc cell is constructed. The gelled zinc anodes, which are commonly employed in such cells, accept recharge poorly, if at all, if the cell is discharged completely. This problem cannot be solved simply by the addition of extra zinc to the anode, since this in turn, will lead to gassing after the depolarizer has become exhausted. For these reasons, it has been necessary in the past to provide special equipment for arbitrary control and limitation of the discharge depth of rechargeable cells, such as automatic voltage or cycle-time cut-offs.

The principal object of the invention is to provide chemical means for the control of the discharge of primary and secondary alkaline-manganese dioxide-zinc cells thus eliminating the need for special equipment for the control of discharge depth.

A further object of the invention is to provide an improved matrix for the replating of zinc upon the recharging of discharged alkaline cells.

Broadly stated, the objects of the invention are accomplished by an improved anode composition which comprises, in addition to powdered metallic zinc, one or more of the following: lead oxide, copper oxide, metallic copper or metallic magnesium. The addition of any one of these materials to a zinc anode will prevent gassing and irreversible damage to both primary and rechargeable cells on deep discharge. In addition, these added materials serve as an excellent matrix for the replating of zinc upon recharging of the cell.

Figure 2:
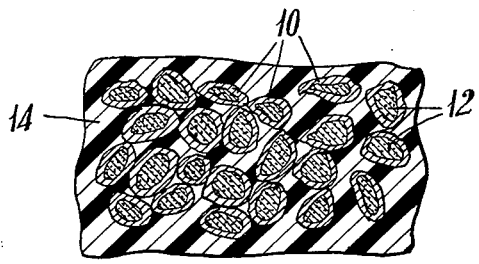

The invention will be more readily understood by referring to the accompanying drawing wherein FIG. 1 is a greatly enlarged cross-section of an anode embodying the principles of the invention, and FIG. 2 is a greatly enlarged cross-section of another anode which embodies the principles of the invention.

More specifically, in the practice of the invention, lead oxide, copper oxide, metallic copper or metallic magnesium is intermixed with powdered metallic zinc to form an anode. While the use of any one of these materials in admixture with zinc results in an improved anode, there are slight differences in each and the improved anode which may be formed from a mixture of powdered zinc and each of the stated materials will be discussed separately.

When powdered zinc and lead oxide are mixed in an alkaline electrolyte, interaction occurs between the two and a portion of the zinc reduces the lead oxide to spongy lead and simultaneously forms zinc oxide which goes into solution as zincate. No gassing can occur on deep discharge in a cell containing an anode of this composition since the voltage difference between lead/lead oxide and partially discharged manganese dioxide diminishes to zero. If such a cell is accidentally reversed, lead oxides are formed. If this cell is connected in series with similar cells which are not reversed, a plateau in the reverse charging curve occurs in the reversed cells prior to the onset of gassing. The time delay resulting therefrom is generally sufficient to allow the driving cells to use up or lose their capacity so that they can no longer supply enough voltage or current to the cell being driven to cause gassing. Accordingly, cell closure failure due to excess gassing is prevented. Accurate adjustments of anode capacity relative to cathode capacity are possible so that complete discharge of the anode will not discharge more than approximately fifty percent of cathodic capacity. Thus, complete exhaustion of the manganese dioxide and resultant irreversible reactions are positively prevented. In addition, this anode composition provides an excellent matrix for redeposition of the zinc upon the charging of the cell. Rechargeable alkaline cells employing these anodes may be discharged to zero volts without sacrificing cycle life.

The use of powdered copper oxide or metallic copper in conjunction with the zinc in a similar manner in addition to providing the above advantages also provides an excellent means for increasing the low temperature conductivity and rechargeable characteristics of the anode. The powdered metallic copper supplied or that formed by the reaction of copper oxide with part of the zinc is not only an excellent electrical conductor but also provides an even better matrix than lead oxide for redeposition of zinc when the cell is recharged. On the other hand, the deep discharge behavior of this composite anode is slightly inferior to that of the lead oxide-zinc anode. If desired, copper powder may be utilized in conjunction with lead oxide, both being mixed with powdered zinc, to combine the superior deep discharge characteristics of the lead oxide with the superior matrix characteristics provided by the copper.

Finally, metallic magnesium may be incorporated in a zinc anode to accomplish the objects of the invention.

Magnesium is highly insoluble in caustic electrolyte but at the same time it maintains good conductivity and serves as a matrix for the zinc upon recharging of the cell. The magnesium serves as a protection on deep discharge and cell reversal because of a spontaneous increase in cell resistance as soon as all the zinc is used up and oxidation of the magnesium begins. The magnesium oxide layer so formed acts as a rectifier in reverse position with a breakdown voltage of several volts. A charge is taken immediately, and at the fully charged point, a rapid voltage rise occurs.

Illustrating the principles of the invention, a lead oxide-zinc anode may suitably be made in the following manner. Equal weights of powdered zinc and yellow lead oxide are combined in a nine normal potassium hydroxide electrolyte. For a D size rechargeable cell, 10 grams of zinc and 10 grams of lead oxide may be combined in 15 milliliters of nine normal potassium hydroxide electrolyte. For primary D size cells, 2-5 grams of lead oxide per 15 grams of zinc is suitable. A D size cell is defined in circular C 466 of the National Bureau of Standards of the United States Department of Commerce. The mixture is warmed by the heat of solution and lead is deposited on the zinc, and the zinc oxide which is formed goes into solution. Suitably, the anode is formed to the particular shape desired by employing a binding agent such as acetylcellulose which may be used in the form of a solution in a fugitive solvent such as acetone.

A number of D size cells containing the composite lead oxide-zinc anode discussed were constructed utilizing cement-bonded manganese dioxide cathodes containing steel wool. The cells were discharged at 2.25 ohm load to zero volts on each cycle, providing about 8 hours service above 0.9 volt. The cells were recharged at 250 milliamps. with a 10-20 percent overcharge. The cells essentially exhibited the same excellent discharge performance even after 20 cycles as they did on the first.

In the practice of the invention, copper oxide may be employed in a similar manner and range.

An alternative method of combining the lead oxide and the zinc consists of preparing a plumbate solution of the lead oxide in the electrolyte and subsequently combining this with the powdered zinc.

The preferred formulation for the composite zinc-magnesium anode is the following: 60 grams of powdered zinc (4% amalgamated) and 10 grams of magnesium powder (40 mesh) are mixed with 25 milliliters of 9 normal potassium hydroxide electrolyte. Zinc oxide and a binding agent, such as acetylcellulose, may be added as desired. Considerable variations of the above anode composition is possible depending upon the desired capacity of the anode. For example, a one-to-one volume ratio of zinc to magnesium may be employed. Metallic copper may be employed in the same manner and range discussed above for magnesium.

A composite anode of zinc and any one of the materials discussed is shown in FIG. 1 wherein the zinc particles 10 and the other powdered material 12, the latter being present in the minority, are embedded in a binding agent 14 of acetylcellulose.

Alternatively, zinc plating of magnesium powder may be employed to produce a suitable composite anode. An anode of this type is shown in FIG. 2 wherein metallic magnesium particles 12 are partially and/or completely plated with zinc 10, the so plated particles 12 being embedded in a binding agent 14 of acetylcellulose.

If the composite copper-lead oxide-zinc anode is desired, the following proportions are suitable: 20-50 grams of powdered copper and 20-50 grams of lead oxide for each 100 grams of powdered zinc, which may be amalgamated if desired.

I claim:

1. For use in primary and secondary alkaline cells employing an electrochemical system chosen from the group consisting of manganese dioxide-zinc, silver oxide-zinc, nickel oxide-zinc and mercuric oxide-zinc, an improved anode which comprises the combination of powdered zinc and at least one of the powdered materials selected from the group consisting of lead oxide, metallic copper, copper oxide, and metallic magnesium; said selected material being present in an effective amount to substantially prevent gassing on deep discharge of said cell; said powdered zinc and said powdered selected material being substantially intermixed throughout said anode.

2. The anode of claim 1 wherein said composite electrode is bound together by acetylcellulose.

3. For use in a primary and secondary alkaline cell employing an electrochemical system chosen from the group consisting of manganese dioxide-zinc, silver oxide-zinc, nickel oxide-zinc and mercuric oxide-zinc, an improved anode which comprises the combination of powdered zinc and powdered lead oxide; said powdered lead oxide being present in an effective amount to substantially prevent gassing on deep discharge of said cell; said powdered zinc and said powdered lead oxide being substantially intermixed throughout said anode.

4. For use in primary and secondary alkaline cells employing an electrochemical system chosen from the group consisting of manganese dioxide-zinc, silver oxide-zinc, nickel oxide-zinc and mercuric oxide-zinc, an improved anode which comprises the combination of powdered zinc and powdered metallic copper; said powdered metallic copper being present in an effective amount to substantially prevent gassing on deep discharge of said cell; said powdered zinc and said powdered metallic copper being substantially intermixed throughout said anode.

5. For use in primary and secondary alkaline cells employing an electrochemical system chosen from the group consisting of manganese dioxide-zinc, silver oxide-zinc, nickel oxide-zinc and mercuric oxide-zinc, an improved anode which comprises the combination of powdered zinc and powdered copper oxide; said powdered copper oxide being present in an effective amount to substantially prevent gassing on deep discharge of said cell; said powdered zinc and said powdered copper oxide being substantially intermixed throughout said anode.

6. For use in primary and secondary alkaline cells employing an electrochemical system chosen from the group consisting of manganese dioxide-zinc, silver oxide-zinc, nickel oxide-zinc and mercuric oxide-zinc, an improved anode which comprises the combination of powdered zinc and powdered metallic magnesium; said powdered metallic magnesium being present in an effective amount to substantially prevent gassing on deep discharge of said cell; said powdered zinc and said powdered metallic magnesium being substantially intermixed throughout said anode.

7. For use in primary and secondary alkaline cells employing an electrochemical system chosen from the group consisting of manganese dioxide-zinc, silver oxide-zinc, nickel oxide-zinc, and mercuric oxide-zinc, an improved anode which comprises the combination of powdered zinc, powdered copper and powdered lead oxide; said powdered copper and powdered lead oxide being present in an effective amount to substantially prevent gassing on deep discharge of said cell; said powdered zinc, said powdered copper and said powdered lead oxide being substantially intermixed throughout said anode.

8. For use in primary and secondary alkaline cells employing an electrochemical system chosen from the group consisting of manganese dioxide-zinc, silver oxide-zinc, nickel oxide-zinc and mercuric oxide-zinc, an improved anode which comprises a plurality of zinc-plated magnesium powders; said magnesium powder being present in an effective amount to substantially prevent gassing on deep discharge of said cell.

9. For use in primary and secondary alkaline cells employing a manganese dioxide-zinc electrochemical system, an improved anode which comprises the combination of powdered zinc and powdered copper oxide; said copper oxide being present in an effective amount to substantially prevent gassing on deep discharge of said cell; said powdered zinc and said powdered copper oxide being substantially intermixed throughout said anode.

10. The anode of claim 9 wherein said composite electrode is bound together by acetylcellulose.

References Cited in the file of this patent

UNITED STATES PATENTS

| | | |
|---|---|---|
| 2,684,989 | Wilburn | July 27, 1954 |
| 2,832,813 | Peters | Apr. 24, 1958 |
| 2,902,530 | Eisen | Sept. 1, 1959 |
| 2,932,680 | Andre | Apr. 12, 1960 |
| 2,934,583 | Stevens | Apr. 26, 1960 |

FOREIGN PATENTS

| | | |
|---|---|---|
| 1,151,414 | France | Aug. 19, 1957 |